(12) United States Patent
Brown et al.

(10) Patent No.: US 11,732,921 B2
(45) Date of Patent: Aug. 22, 2023

(54) STEPPED STAGED CONTROL OF A VARIABLE CAPACITY COMPRESSOR

(71) Applicant: WaterFurnace International, Inc., Fort Wayne, IN (US)

(72) Inventors: Robert R. Brown, Markle, IN (US); Dennis L. Harris, Harmony, FL (US)

(73) Assignee: WaterFurnace International, Inc., Fort Wayne, IN (US)

( * ) Notice: Subject to any disclaimer, the term of this patent is extended or adjusted under 35 U.S.C. 154(b) by 0 days.

(21) Appl. No.: 17/469,113

(22) Filed: Sep. 8, 2021

(65) Prior Publication Data
US 2023/0071945 A1 Mar. 9, 2023

(51) Int. Cl.
*F24F 11/63* (2018.01)
*F24F 11/86* (2018.01)
*F24F 110/10* (2018.01)

(52) U.S. Cl.
CPC .............. *F24F 11/86* (2018.01); *F24F 11/63* (2018.01); *F24F 2110/10* (2018.01)

(58) Field of Classification Search
CPC ........ F24F 11/86; F24F 11/63; F24F 2110/10; F24F 11/30; F25B 49/022; F25B 49/025
See application file for complete search history.

(56) References Cited

U.S. PATENT DOCUMENTS

| | | | | |
|---|---|---|---|---|
| 5,088,297 A * | 2/1992 | Maruyama | ............ | F25B 49/025 318/811 |
| 2002/0119050 A1* | 8/2002 | Nakamura | .......... | F04D 27/0261 417/2 |
| 2012/0324928 A1* | 12/2012 | Durham | ............. | G05B 13/0205 96/397 |
| 2013/0260668 A1* | 10/2013 | Stakutis | .................... | F24F 11/74 454/256 |
| 2014/0202188 A1* | 7/2014 | Hrejsa | ..................... | F25B 49/02 236/51 |
| 2014/0230464 A1* | 8/2014 | Abbasi | ..................... | F25D 29/00 62/228.1 |
| 2015/0204567 A1* | 7/2015 | Sakai | .................. | F24D 19/1084 236/1 C |
| 2015/0204571 A1* | 7/2015 | Messmer | ................. | F24F 11/30 454/256 |
| 2015/0321298 A1* | 11/2015 | Chen | ..................... | F25B 49/025 29/890.035 |
| 2017/0241658 A1* | 8/2017 | Salsbury | .................. | F24F 11/83 |

(Continued)

*Primary Examiner* — Alicia M. Choi
(74) *Attorney, Agent, or Firm* — Faegre Drinker Biddle & Reath LLP

(57) ABSTRACT

A control method for a space conditioning system operable with a stages thermostat, the method including: powering a control module comprising including an output terminal, a first input terminal, a second input terminal, and control logic; detecting receipt of the first input signal at the first input terminal; responsive to detecting receipt of the first input signal, outputting a first value of the plurality of values, the first value corresponding to the first input signal; after outputting the first value, outputting one or more values of the plurality of values, the one or more values being larger than the first value; detecting receipt of the second input signal at the second input terminal; and responsive to detecting receipt of the second input signal, outputting a second value of the plurality of values, the second value corresponding to the second input signal.

16 Claims, 5 Drawing Sheets

(56) References Cited

U.S. PATENT DOCUMENTS

| | | | |
|---|---|---|---|
| 2017/0268812 A1* | 9/2017 | Trudeau | F25B 49/022 |
| 2020/0284469 A1* | 9/2020 | Mowris | F24F 11/46 |
| 2021/0018206 A1* | 1/2021 | Barooah | F24F 11/64 |
| 2022/0065489 A1* | 3/2022 | Altman | F24F 11/88 |

* cited by examiner

STEPPED STAGED CONTROL OF A VARIABLE CAPACITY COMPRESSOR

CROSS-REFERENCE TO RELATED APPLICATIONS

None.

TECHNICAL FIELD

The disclosure relates generally to methods and systems to control air temperatures in spaces. More particularly, the disclosure relates to control methods and systems for space conditioning systems with variable speed compressors.

BACKGROUND OF THE DISCLOSURE

A typical space conditioning system may include a compressor that circulates a refrigerant in a load loop to extract or inject heat from or to a target space. An indoor coil, a motor-driven fan blowing air through the coil to condition the air, and control logic cooperate to maintain a target temperature in the target space. A heater, e.g. gas or electric, may be provided to heat the target space in winter. The control logic controls the compressor and fan motors. The fan, or blower, may be driven by a variable speed drive. Generally, a condenser rejects heat to the air outside the conditioned space, e.g. to the outside environment. The heat may also be transferred by a fluid to the earth in an earth ground loop. A heat pump system is a space conditioning system that provides both heating and cooling by reversing the flow of refrigerant. The heat pump system extracts heat from the target space in a cooling mode and injects heat in a heating mode. In winter, the heat pump system may receive heat from the source loop and exchange the heat with the load loop to heat the target space. The heater may provide auxiliary heat in winter.

Traditionally, a thermostat connected to the control logic enables a user to set target temperatures, or temperature setpoints, according to a programmable schedule. The thermostat outputs a first stage (Y1) and second stage (Y2) and even a third stage (W) command signal, for instance, to engage first, second, and third stages, respectively, of a compressor. Such a thermostat is referred to herein as a "stages" thermostat. With the advent of compressors equipped with variable speed drives, infinitely variable capacity is possible but to benefit from such drives a corresponding infinitely variable control signal is needed, typically of a variable capability like 0-10 VDC or a communicated command signal f 0-100%. It should be understood that "infinitely variable" as used herein indicates incremental control levels that far exceed the number of stages of a compressor, but due to implementation in digital control systems, the incremental control levels are, strictly speaking, discrete. A thermostat that outputs an "infinitely variable" control signal is referred to herein as a "variable speed" thermostat. A stages thermostat can be used with a traditional variable speed drive/infinitely variable capacity compressor, but such combination fails to capture the potential benefits of using a variable speed drive/infinitely variable capacity compressor because the infinitely variable capacity compressor is controlled as a staged compressor.

There is a need to provide cost effective systems and control devices that capture the potential benefit of variable speed compressors without requiring corresponding variable speed control signals from a thermostat.

SUMMARY OF DISCLOSED EMBODIMENTS

In a first aspect of the disclosure a control module is provided to implement a method suitable to permit use of a stages thermostat with a variable speed compressor. With such a control module a variable speed compressor can be used without requiring retrofitting of the thermostat and respective wiring while also capturing the benefits of variable speed compressors. In one embodiment of the first aspect, the control module comprises: an output terminal configured to output a speed reference signal having a plurality of values corresponding to a plurality of speeds of a motor; a first input terminal, the first input terminal configured to receive a first input signal from the stages thermostat; a second input terminal, the second input terminal configured to receive a second input signal from the stages thermostat, the second input signal corresponding to a second value of the plurality of values; and control logic operable to cause the control module to: detect receipt of the first input signal at the first input terminal; responsive to detecting receipt of the first input signal, output a first value of the plurality of values, the first value corresponding to the first input signal; after outputting the first value, output one or more values of the plurality of values, the one or more values being larger than the first value; detect receipt of the second input signal at the second input terminal; and responsive to detecting receipt of the second input signal, output a second value of the plurality of values, the second value corresponding to the second input signal.

The control logic may be integrated in a controller. The control logic may comprise a software program executable by a processor.

In a second aspect, a method suitable to permit use of a stages thermostat with a variable speed compressor is disclosed. In one embodiment of the second aspect, the method including: powering a control module comprising including an output terminal, a first input terminal, a second input terminal, and a controller including control logic; detecting receipt of the first input signal at the first input terminal; responsive to detecting receipt of the first input signal, outputting a first value of the plurality of values, the first value corresponding to the first input signal; after outputting the first value, outputting one or more values of the plurality of values, the one or more values being larger than the first value; detecting receipt of the second input signal at the second input terminal; and responsive to detecting receipt of the second input signal, outputting a second value of the plurality of values, the second value corresponding to the second input signal.

The method may be implemented by control logic as in the first embodiment of the first aspect.

In a third aspect, a space conditioning system comprising a control module as in any one of the embodiments thereof disclosed herein is provided. The space conditioning system implements a method, as described in various embodiments herein, suitable to permit use of a stages thermostat with a variable speed compressor. The space conditioning system comprises an inverter configured to receive the speed reference signal from the control module and to output a motor voltage having a frequency corresponding to the speed reference signal. The space conditioning system may include a compressor with the variable speed motor controlled by the motor voltage.

BRIEF DESCRIPTION OF THE DRAWINGS

The above-mentioned and other disclosed features, the manner of attaining them, and the benefits and advantages thereof, will become more apparent and will be better understood by reference to the following description of disclosed embodiments taken in conjunction with the accompanying drawings, wherein.

Figure 1:
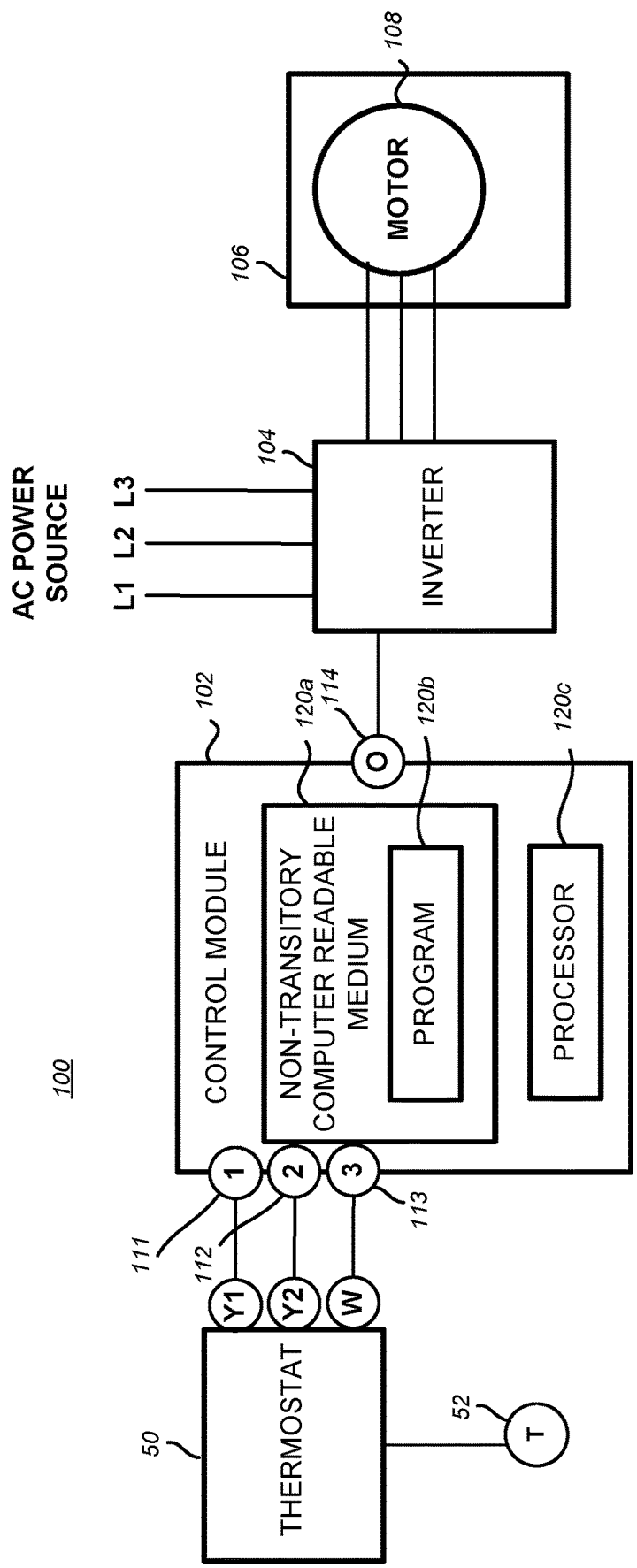
FIG. 1 is a block diagram of a space conditioning system in accordance with an embodiment set forth in the disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present invention. The exemplification set out herein illustrates embodiments of the disclosure, and such exemplifications are not to be construed as limiting the scope of the invention in any manner.

DETAILED DESCRIPTION OF EXEMPLARY EMBODIMENTS OF THE INVENTION

Referring to FIG. 1, a space conditioning system 100 is shown including a control module 102, an inverter 104, and a compressor 106 including a motor 108. A stages thermostat 50 receives a temperature indication from a temperature transducer 52 and outputs stage signals Y1, Y2, and W, which are referred to as first, second, and third signals received by first, second and third input terminals 111, 112, 113 of control module 102. Control module 102 outputs a speed reference signal from an output terminal 114 which is received by inverter 104. Inverter 104 is a traditional inverter that receives AC power from a power source via lines L1, L2 and L3 and converts the AC power to DC power before converting the DC power to a variable frequency voltage corresponding to the speed reference signal. Other means of converting AC power to control the motor at a variable speed are also envisioned, such as means to control a single-phase motor or a DC motor, for example.

Control module 102 and inverter 104 may be integrated to form a variable speed drive in a common enclosure, for example. The control module could be integrated with the inverter or could be integrated with other components of the space conditioning system 100.

In various embodiments, control module 102 is operable with stages thermostat 50 and includes output terminal 114, configured to output the speed reference signal, having a plurality of values corresponding to a plurality of speeds of motor 108; first input terminal 111, configured to receive the first input signal from stages thermostat 50; second input terminal 112, configured to receive the second input signal from stages thermostat 50, the second input signal corresponding to a second value of the plurality of values; and control logic 120a, 120b, 120c operable to cause control module 102 to: detect receipt of the first input signal at first input terminal 111; responsive to detecting receipt of the first input signal, output a first value of the plurality of values, the first value corresponding to the first input signal; after outputting the first value, output one or more values of the plurality of values, the one or more values being larger than the first value and smaller than a second value; detect receipt of the second input signal at second input terminal 112; and responsive to detecting receipt of the second input signal, output a second value of the plurality of values, the second value corresponding to the second input signal.

To receive or detect receipt of an input signal refers to the determination that a signal of a particular status is present at an input terminal. The determination is made by the control logic by monitoring a voltage or current at the input terminal and determining that the voltage or current correspond to a particular on/off status. For example, 0 or 24 volts DC can indicate one status or another, e.g. on/off. The signal level is indicative of the presence of the signal or, alternatively, withdrawal of the signal. Other voltages, e.g. greater or less than X volts, can also be used to determine the on/off status. Receipt suggest that the signal changed from off to on, and withdrawal suggests that the signal changed from on to off. Of course, receipt and detection can take place according to the data acquisition frequency of the control logic and does not need to occur instantaneously or concurrently with the transition of the signal. Well known signal acquisition circuits are used to digitize the voltage level with an analog to digital converter circuit. The detection can also be binary in which case an analog to digital converter is not needed. Binary detection can comprise a circuit with, for example, an opto-coupler triggered by a particular voltage level. To output a value means to generate a signal that is made available to the inverter. The signal can be analog or digital, depending on the inverter. Serial or parallel communication interfaces can be used to communicate the output value to the inverter and are referred to herein as "output terminal." Alternatively, analog, e.g. 0-10 volts DC or 4-20 mA, signals can be generated with a digital to analog converter and made available at the output terminal of the control module. The control logic thus may include a digital to analog converter and one or more detection circuits, whether binary or analog to digital converters.

The term "logic" or "control logic" as used herein includes software and/or firmware executing on one or more computers, central processing units, programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. As shown, control logic includes non-transitory computer readable medium 120a including a program 120b comprising processing steps executable by a processor 120c.

The terms "circuit" and "circuitry" refer generally to hardwired logic that may be implemented using various discrete components such as, but not limited to, diodes, bipolar junction transistors, field effect transistors, etc., which may be implemented on an integrated circuit using any of various technologies as appropriate, such as, but not limited to CMOS, NMOS, PMOS etc.

The present embodiment will be described with reference to FIG. 2, which is a speed graph showing speed vs. time as a function of the first, second and third input signals (e.g. Y1, Y2, W). At time t1, the first input signal from stages thermostat 50 is received, and responsive to detecting receipt of the first input signal, the control logic causes output of the first value s1,1 of the plurality of values, the first value corresponding to the first input signal, which is represented by the first numeral. The second numeral represents the value. Thus, while the first signal is received, the plurality of values would be represented by s1,i, where i increases to represent additional values of the plurality of values. The speed reference signal remains as s1,1 until time t1,2, when the speed reference signal increases to s1,2. The time elapsed between t1,1 and t1,2 is represented by time period p1,1. The speed reference signal remains as s1,2 during time period p1,2 until time t2. The time t1,2 can be predetermined or, as explained below, result from a calculation of a rate of change.

The dashed line p11b illustrates that the speed would have remained at s1,1 until time t2 in a prior art system. The addition of speed s1,2 is thus an improvement over the prior art.

At time t2, the second input signal from stages thermostat 50 is received, and responsive to detecting receipt of the second input signal, the control logic causes output of the second value s2,1 of the plurality of values, the second value corresponding to the second input signal. The speed reference signal remains as s2,1 during time period p2 until time t3, when the speed reference signal increases to s3.

Figure 3:
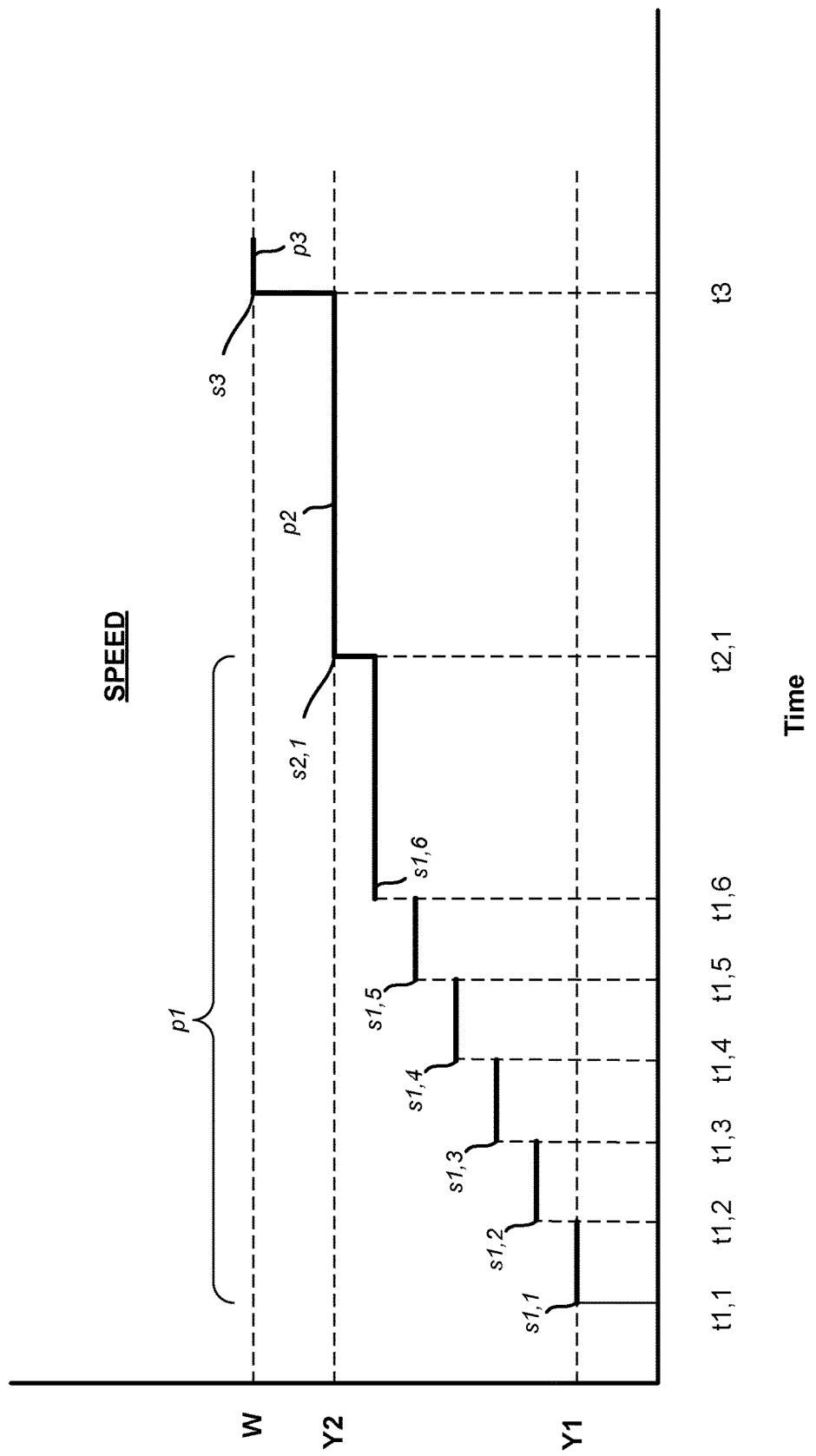
FIG. 3 is a graph showing a speed graph illustrating speed vs. time as a function of first, second and third input signals from a thermostat.

The method described above increases the speed from s1,1 to s1,2 and then to s3, therefore 4 speed values were output based on 3 input signals (instead of 3 speed values), thus improving the speed control and efficiency of the compressor. This simplistic example can be expanded for illustrative purposes, as shown in FIG. 3, to include speeds s1,1 . . . 6, s2,1 and s3, at times t1,1 . . . 6, t2,1 and t3, therefore 8 speed values were output based on 3 input signals. Times t1,1 . . . 6 represent a first time period p1, and the interval between t2,1 and t3 represents a second time period p2. Times t1,1 . . . 6 occur at a regulated time interval during the first time period.

Figure 2:
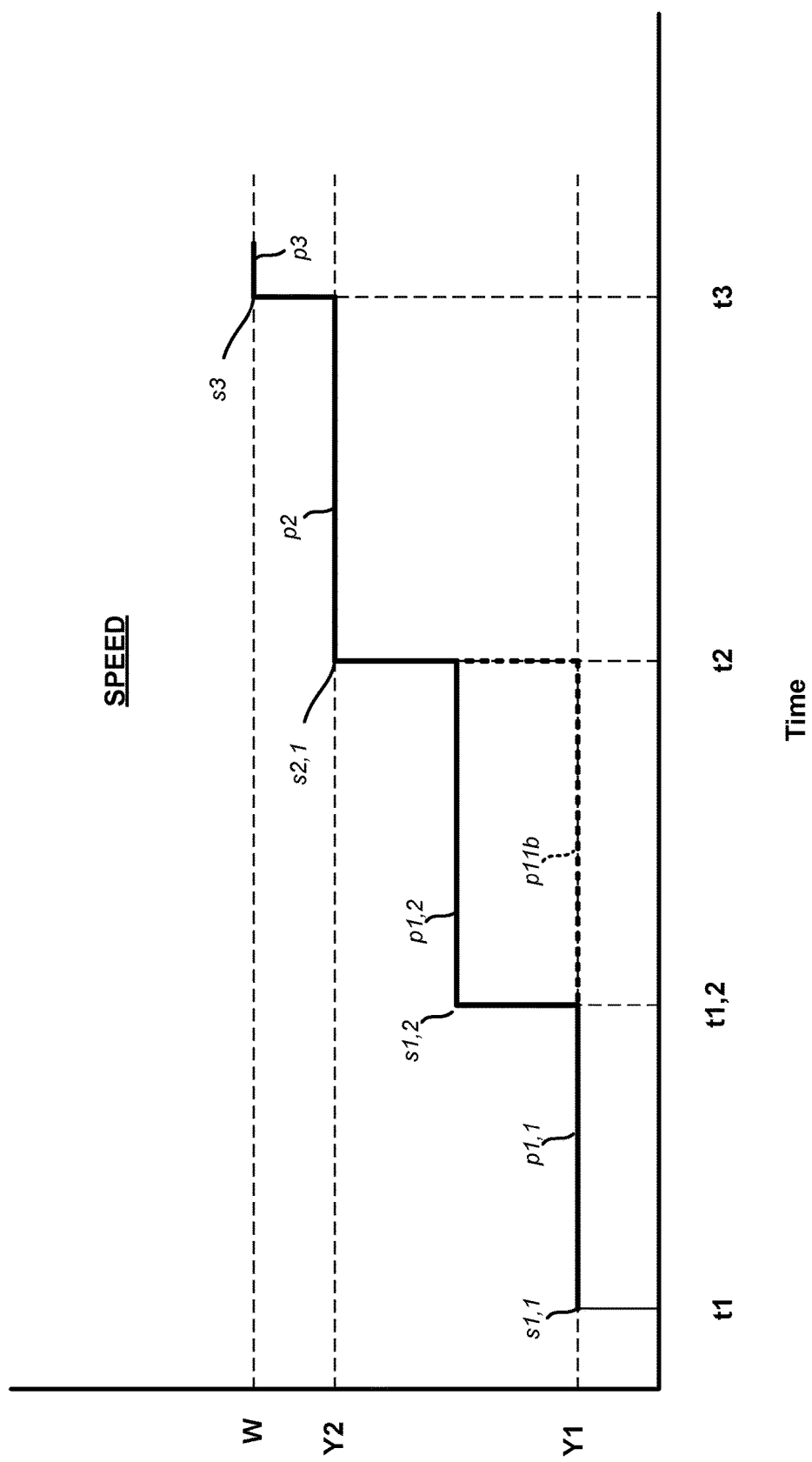
FIG. 2 is a graph showing a speed graph illustrating speed vs. time as a function of first, second and third input signals from a thermostat.
Figure 4:
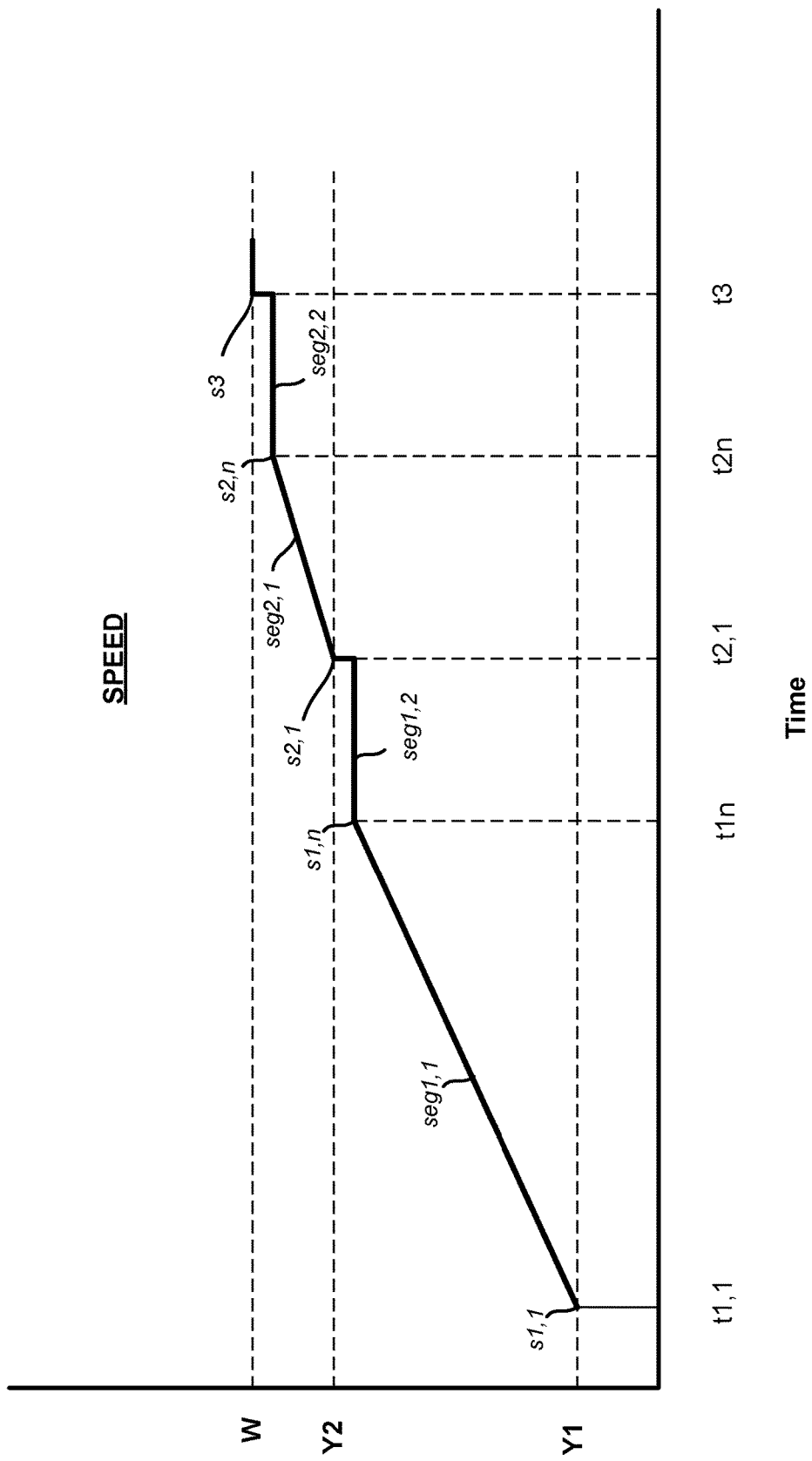
FIG. 4 is a graph showing a speed graph illustrating speed vs. time as a function of first, second and third input signals from a thermostat.

FIGS. 2 and 3 illustrate different control resolutions. The regulated time, or periodicity of the speed increases/decreases, can be increased to increase resolution and thus approximate infinitesimal speed steps, as shown in FIG. 4, where the speed steps are so small as to resemble a continuous line segment seg1,1 between times t1,1 and t1,n, when the control logic reaches a maximum speed s1,n. In this manner a stages thermostat with the learning controller controls the variable speed drive at a multitude of speeds approximating continuously variable control. The resolution of the control scheme can approximate continuous variable control to various degrees. A system designer would thus balance computational cost and the effective benefit of increased resolution to set a desired control resolution.

The speed is maintained (line segment seg1,2) until the second input signal is received. As shown, the maximum speed during the first stage, s1,n, is slower than the second speed. It is also possible that the maximum speed of a preceding stage exceed the initial speed of the next stage (in the case of increasing speeds) because, since the speed increases are incremental, it might not make a practical difference. For example, if the first and second speeds are 20 Hz and 65 Hz, and the speed were increased in 2 Hz steps, the maximum speed of the first stage could be 64 or 66 Hz. From a compressor performance standpoint, a 1 Hz difference (on either side of 65 Hz) would not be noticeable or detrimental. Thus, when configuring the control logic, the system would include the first and second speeds, corresponding to the first and second input signals, a maximum speed for the first stage, and if there is a third stage, also a third speed corresponding to the third input signal and a maximum speed for the second stage. Alternatively, the control logic could be programmed to evaluate each speed increment and stop implementation of the evaluated increment if the evaluated increment exceeds the initial speed of the following stage. Following the example above, the control logic would calculate a speed of 66 Hz, determine that it exceeds 65 Hz (the initial speed of the second stage), and thus not implement the speed increase and instead hold the speed at 64 Hz.

The control logic can be a learning control logic, meaning that the rate of change can change based on historical performance. A processing cycle comprises, for the purpose of calculating the rate of change, the method steps that take place between receipt of the first input signal and the second input signal which are needed to determine the duration of the first time period. The first and second values are predetermined and can be, for example, 20% and 65% of the speed range of the motor. The rate of change can be a predetermined rate of change during an initial processing cycle of the control logic, since the first time period has not transpired during the initial processing cycle.

Segment seg1,1 is shown as a straight line but can also be curved. Thus, as used herein, the rate of change of the speed refers to the rate of change between s1,1 at t1,1 and s2,1 at t2,1, calculated based on the duration of the first time period during a preceding processing cycle of the control logic. The control logic may average the times during a few processing cycles to calculate the rate of change instead of using only one processing cycle.

The first value and the one or more values following the first value can be based on a linear model. The linear model can represent a straight line, in which case the rate of change is the slope of the straight line, or a curved line. The linear model can be represented by a table of incrementally larger values read by the control logic to determine the one or more values. A traditional 3 stage (Y1, Y2, W) thermostat can apply different staging logic, such as proportional (P), proportional/integral (PI), and full proportional/integral/derivative (PID), to determine, based on sensed temperature, when to switch between the stages. Accordingly, P, PI, or PID logic will result in different amounts of time at each stage, referred to as "stage times". The same staging logic or other staging logic can be used by the controller to increase or decrease speed. Thus, the first value and the one or more values following it can also be based on a model that is not necessarily a linear model.

In one example mentioned above, during a first processing cycle the first time period p1 is measured and is subsequently used to calculate a rate of change that would gradually increase the speed from s1,1 to s2,1, substantially voiding the segment seg1,2 if the conditions in the conditioned space remained constant. However, because the conditions may vary the calculated rate during one processing cycle may be different from a subsequent processing cycle, and this variation is represented by either segment seg1,2, showing that the rate of change was too aggressive and the speed s1,n was reached too soon, or the speed not reaching s1,n, showing that the rate of change was not aggressive enough. In either case, the calculation of the rate of change based on a previous processing cycle increases greatly the efficiency of the variable speed compressor based on the use of discrete input signals. The same process is used to determine a rate of change for segment seg2,1 (second rate of change), which can be different from the rate of change. Alternatively, the same rate of change can be used.

In one example, the initial rate of change equals 0 during the first processing cycle, and the speed remains at s1,1 until the second input signal is received. The time period p1 is then used calculate a rate of change to be used during the next processing cycle. Thus, a subsequent processing cycle of the control logic can use the period p1 of the preceding processing cycle and the system continues to learn. Alternatively, the rate of change can be adapted until the constant speed period after t1,n (seg1,2) is smaller than a threshold, and then maintained unless the constant speed period after t1,n becomes greater than the threshold. This improvement would reduce computational costs by recalculating the rate of change only when necessary and not continuously. The threshold (time) can be set to determine when it is necessary to recalculate the rate of change and may be increased if the computational capacity of the system is near its limit, for example.

In another example, the initial rate of change equals a value greater than 0 during a first processing cycle, this value being a predetermined initial rate of change. This improvement increases efficiency during the first processing cycle of the control logic. This non-zero value is arbitrary and can be based on historical performance. For example, the control logic could maintain an average rate of change in memory and use it as the initial rate of change.

The foregoing examples describe situations where the speed increases to increase capacity. The same method can be used to decrease capacity, by calculating a negative rate of change.

In another aspect of the disclosure a method is provided for controlling a variable speed compressor operable with a stages thermostat, in one embodiment the method comprising: powering a control module as in the first aspect; detecting receipt of the first input signal at the first input terminal; responsive to detecting receipt of the first input signal, outputting a first value of the plurality of values, the first value corresponding to the first input signal; after outputting the first value, outputting one or more values of the plurality of values, the one or more values being larger than the first value and smaller than a second value; detecting receipt of the second input signal at the second input terminal; and responsive to detecting receipt of the second input signal, outputting a second value of the plurality of values, the second value corresponding to the second input signal.

Figure 5:
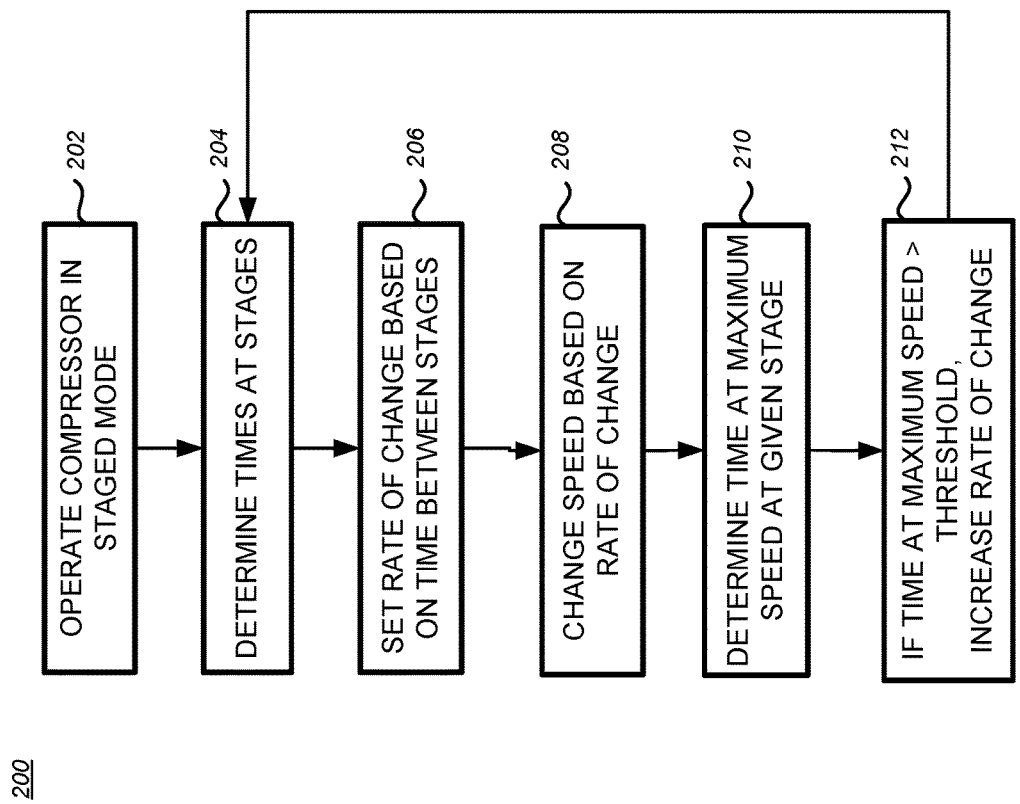
FIG. 5 is a flowchart of a control method in accordance with an embodiment set forth in the disclosure.

An example of the foregoing embodiment will now be described with reference to FIG. 5 which depicts a flowchart 200. At block 202, the method begins by operating the compressor in a staged mode. In the staged mode the compressor operates in as many speeds as there are thermostat stages. Thus, if the thermostat has 3 wires, providing 3 input signals, the compressor operates at 3 speeds.

Block 204. While operating in staged mode, the control logic determines how long the compressor operates at each stage by tracking time between pairs of input signals. The control logic may average the times during a few processing cycles.

Block 206. Using the calculated times, the control logic calculates rates of change suitable to increase the speed in subsequent processing cycles.

Block 208. In subsequent processing cycles the rate of change is used to set speed increments and intervals to ramp the speed from the first speed to a maximum speed in the first interval which is slower than the second speed and from the second speed to a maximum speed in the second interval which is slower than the third speed. For example, the maximum speeds could be 64% and 98% of the speed range if the second and third speeds are 65% and 99% of the speed range of the compressor and the speeds are incremented at 1% increments with a straight-line model.

Block 210. The processing logic calculates, optionally, how long the speed is maintained at the maximum value.

Block 212. If the time at the maximum speed value exceeds a predetermined threshold, the control logic decreases the rate of change, for example by recalculating the rate of change based on the immediately preceding processing cycle or average of processing cycles, to reduce the time at the maximum speed to below the threshold time.

The stages thermostat can be a traditional 24V stages thermostat to operate a variable capacity compressor continuously from, for example, 20-100% of the operating range of the compressor. In some embodiments, the stages thermostat signals (Y1, Y2, W) each initially cause the controller to operate the compressor at predetermined speeds (i.e. 25, 65, 100%) of the variable speed drive/compressor. To allow operation between the initial speeds, the controller monitors the duration of each thermostat signal at each initial speed to learn from the transitions between Y1, Y2, and W, and then the controller progressively increases the compressor speed between the initial speeds.

The Y1 signal is used to control speed in the 25-64% range, the Y2 signal is used to control speed in the 65-99% range, and the W signal is used to control speed above 99% and to control electric heat stages (in the heating mode of the system) based upon duration time at each of the Y1, Y2, and W stages. The previous rate increase from Y1 to Y2, for instance, is remembered and used to increase speed progressively from the speed corresponding to Y1 to the speed corresponding to Y2.

When the thermostat calls for stage 1 (Y1), the compressor starts at the prescribed 25% speed but also starts a timer logging the length of the current Y1 call. The speed is then increased using a predetermined speed % rate increase per minute from the initial 25% thru the speed range until it reaches 64% where it will pause increasing and hold at that speed until a Y2 call is received from the thermostat or the Y1 call disappears (satisfied). If the Y1 disappears the compressor is ramped down to off.

At the point of the Y2 signal initiation, the compressor moves to 65% speed, the timing elapsed from Y1 to Y2 is documented for learning purposes and the Y2 timer is started. The speed is then increased using a predetermined speed % rate increase per minute from the initial 65% thru the speed range until it reaches 99% where it will pause and hold until a W call is received from the thermostat or the Y2 call disappeared (satisfied). If the Y2 disappears the compressor is ramped down, for example to Y1 mid speed of 45% and then continue down to 25% after specified period of time with the continued Y1.

At the point of the W signal initiation, after Y1 and Y2 calls have been engaged, the compressor moves to 100% speed, the timing elapsed from Y2 to W is documented for learning purposes and the W timer is started. The compressor is maintained at 100% and Elect Heat stage 1 and stage 2 are brought on in a predetermined timing sequence or the W call disappeared (satisfied). If the W call disappears the compressor is ramped down to Y2 mid speed of 82% and then continue down to 65% after specified period of time with the continued Y1.

As used herein, a processor or controller may be a specifically constructed apparatus or may comprise general purpose computers selectively activated or reconfigured by software programs stored therein. Whether specifically constructed or general purpose, the processor or controller executes processing instructions stored in computer readable storage media, or memory. Many combinations of processing circuitry and information storing equipment are known by those of ordinary skill in these arts. A processor may be a microprocessor, a digital signal processor (DSP), a central processing unit (CPU), or other circuit or equivalent capable of interpreting instructions or performing logical actions on information. A processor encompasses multiple processors integrated in a motherboard and may also include one or more graphics processors and embedded memory. Exemplary processing systems include workstations, personal computers, portable computers, portable wireless devices, mobile devices, and any device including a processor, memory and software. Processing systems also encompass one or more computing devices and include computer networks and distributed computing devices.

As used herein, a non-transitory computer readable storage medium comprises any medium configured to store data, such as volatile and non-volatile memory, temporary and cache memory and optical or magnetic disk storage. Exemplary storage media include electronic, magnetic, optical, printed, or media, in any format, used to store information. Computer readable storage medium also comprises a plurality thereof.

The above detailed description of the invention and the examples described therein have been presented only for the purposes of illustration and description. It is therefore contemplated that the present invention cover any and all modifications, variations or equivalents that fall within the spirit and scope of the basic underlying principles disclosed above and claimed herein.

What is claimed is:

1. A control module for a space conditioning system operable with a stages thermostat, the control module comprising:
    an output terminal configured to output a speed reference signal having a plurality of values corresponding to a plurality of speeds of a motor;
    a first input terminal, the first input terminal configured to receive a first input signal from the stages thermostat;
    a second input terminal, the second input terminal configured to receive a second input signal from the stages thermostat, the second input signal corresponding to a second value of the plurality of values; and
    control logic operable to cause the control module to:
        detect receipt of the first input signal at the first input terminal;
        responsive to detecting receipt of the first input signal, output a first value of the plurality of values, the first value corresponding to the first input signal;
        after outputting the first value, output one or more values of the plurality of values, the one or more values being larger than the first value;
        detect receipt of the second input signal at the second input terminal; and
        responsive to detecting receipt of the second input signal, output a second value of the plurality of values, the second value corresponding to the second input signal,
        wherein the one or more values are based on a rate of change, the rate of change being a ratio of the difference between the second value and the first value and a time period between receipt of the second input signal and the first input signal during a preceding processing cycle of the control logic.

2. The control module of claim 1, wherein the one or more values are smaller than the second value.

3. The control module of claim 1, wherein the rate of change is a predetermined rate of change during an initial processing cycle of the control logic.

4. The control module of claim 1, wherein the first value and the one or more values are based on a linear model.

5. The control module of claim 4, wherein the linear model represents a straight line.

6. The control module of claim 4, wherein the linear model represents a curved line.

7. The control module of claim 4, wherein the linear model is represented by a table of incrementally larger values read by the control logic to determine the one or more values.

8. The control module of claim 1, wherein the first value and the one or more values are based on a proportional-derivative or a proportional-derivative-integral control model.

9. The control module of claim 1, wherein the control logic is operable to cause the control module to, after outputting the second value:
    detect withdrawal of the second input signal at the second input terminal; and
    responsive to detecting withdrawal of the second input signal, output one or more values of the plurality of values smaller than the second value and larger than the first value.

10. The control module of claim 9, wherein the one or more values smaller than the second value and larger than the first value are based on a second rate of change.

11. The control module of claim 10, wherein the rate of change and the second rate of change are different.

12. The control module of claim 1, further comprising a third input terminal, the third input terminal configured to receive a third input signal from the stages thermostat, the third input signal being larger than the second input signal, the third input signal corresponding to a third value of the plurality of values, wherein the control logic is operable to cause the control module to:
    after outputting the second value, output one or more values of the plurality of values, the one or more values being larger than the second value;
    detect receipt of the third input signal at the third input terminal; and
    responsive to detecting receipt of the third input signal, output the third value.

13. A space conditioning system comprising a control module as in claim 1 and an inverter configured to receive the speed reference signal and to output a motor voltage having a frequency corresponding to the speed reference signal.

14. A control method for a space conditioning system operable with a stages thermostat, the method comprising:
    powering a control module comprising:
        an output terminal configured to output a speed reference signal having a plurality of values corresponding to a plurality of speeds of a motor;
        a first input terminal, the first input terminal configured to receive a first input signal from the stages thermostat;
        a second input terminal, the second input terminal configured to receive a second input signal from the stages thermostat, the second input signal corresponding to a second value of the plurality of values; and
        control logic;
    detecting receipt of the first input signal at the first input terminal;
    responsive to detecting receipt of the first input signal, outputting a first value of the plurality of values, the first value corresponding to the first input signal;

after outputting the first value, outputting one or more values of the plurality of values, the one or more values being larger than the first value;
detecting receipt of the second input signal at the second input terminal; and
responsive to detecting receipt of the second input signal, outputting a second value of the plurality of values, the second value corresponding to the second input signal, and for a processing cycle after an initial processing cycle, calculating a rate of change as a ratio of the difference between the second value and the first value and a time period between receipt of the second input signal and the first input signal during a preceding processing cycle of the control logic.

15. The method of claim 14, wherein the rate of change is a predetermined rate of change during the initial processing cycle of the control logic.

16. A control module for a space conditioning system operable with a stages thermostat, the control module comprising control logic operable to implement the method of claim 14.

* * * * *